United States Patent
Kumar et al.

(10) Patent No.: US 12,287,879 B2
(45) Date of Patent: Apr. 29, 2025

(54) SYSTEM, METHOD, AND COMPUTER PROGRAM FOR ORCHESTRATING PATCHING OF MICROSERVICES

(71) Applicant: Amdocs Development Limited, Limassol (CY)

(72) Inventors: Anil Kumar, Pune (IN); Ian Klein, Hatfield (GB); Edouard Goldberg, Cherry Hill, NJ (US); Amish Rao, Pune (IN); Aditya Samant, Pune (IN); Mahesh Kumar Tiwari, Lucknow (IN); Nir Makmal, Petah Tikva (IL); Asher Biton, Rehovot (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 361 days.

(21) Appl. No.: 17/731,142

(22) Filed: Apr. 27, 2022

(65) Prior Publication Data
US 2023/0351020 A1 Nov. 2, 2023

(51) Int. Cl.
| | |
|---|---|
| G06F 8/65 | (2018.01) |
| G06F 8/61 | (2018.01) |
| G06F 21/57 | (2013.01) |
| G06N 20/00 | (2019.01) |
| H04L 67/00 | (2022.01) |

(52) U.S. Cl.
CPC .............. *G06F 21/572* (2013.01); *G06F 8/61* (2013.01); *G06F 8/65* (2013.01); *G06N 20/00* (2019.01); *H04L 67/34* (2013.01)

(58) Field of Classification Search
CPC .................................................. G06F 21/572
See application file for complete search history.

(56) References Cited

U.S. PATENT DOCUMENTS

| | | | |
|---|---|---|---|
| 2019/0171433 A1* | 6/2019 | Groseclose | G06F 8/65 |
| 2019/0205300 A1* | 7/2019 | Koerner | G06F 16/2471 |
| 2019/0268353 A1* | 8/2019 | Ahuja | H04L 63/02 |
| 2020/0249928 A1 | 8/2020 | Zeng et al. | |
| 2021/0271489 A1* | 9/2021 | Singhal | G06F 8/63 |
| 2021/0397429 A1* | 12/2021 | Gonzalez | G06F 8/65 |
| 2022/0027145 A1* | 1/2022 | Wang | G06F 8/658 |
| 2023/0351020 A1* | 11/2023 | Kumar | G06N 20/00 |

OTHER PUBLICATIONS

Unknown author, "Kubernetes", printed: Dec. 9, 2024, https://en.wikipedia.org/w/index.php?title=Kubernetes&oldid=1262067478, 23 pages. (Year: 2024).*
Network, "Why is it Important to Update Security Patches?" NetworkCoverage, 2021, 7 pages, retrieved from https://www.netcov.com/why-is-it-important-to-update-security-patches/.
International Search Report and Written Opinion from PCT Application No. PCT/IB2023/054154, dated Jul. 25, 2023, 13 pages.
Semilof, M., "What is 12 factor app (twelve-factor app)?" Definition from Tech Target, Dec. 2018, 5 pages, retrieved from https%3A%2F%2Fwww.techtarget.com%2Fsearchsoftwarequality%2Fdefinition%2Ftwelve-factor-app.

* cited by examiner

*Primary Examiner* — Ponnoreay Pich
(74) *Attorney, Agent, or Firm* — Zilka-Kotab, P.C.

(57) ABSTRACT

As described herein, a system, method, and computer program are provided orchestrating patching of microservices. A plurality of microservice patches are detected, the plurality of microservice patches made available for a plurality of different cloud platforms each provided by a different cloud provider of a plurality of cloud providers. Further, installation of the plurality of microservice patches in a running production system is centrally managed.

5 Claims, 6 Drawing Sheets

SYSTEM, METHOD, AND COMPUTER PROGRAM FOR ORCHESTRATING PATCHING OF MICROSERVICES

FIELD OF THE INVENTION

The present invention relates to software patching.

BACKGROUND

A security patch is an update configured for a software application, which are usually created to address some hole, vulnerability, error, or other issue in the application. Usually, a software patch will be created when the issue is detected after the initial release of the application or after are more comprehensive update to the application has already been released. Generally, it is important to install available security patches to address a corresponding issue in the application that could otherwise be exploited by a hacker.

However, in the realm of cloud-based computing where an organization may utilize the microservices of many different cloud providers, it is a complex activity to ensure that all software components in live running production environments are properly patched. This is especially true where each cloud provider independently provides some capability to install patches at their own platform level, thus requiring a user to independently manage the patching process per cloud provider. To date, there is no central management tool for patching functional microservices applications.

There is thus a need for addressing these and/or other issues associated with the prior art.

SUMMARY

As described herein, a system, method, and computer program are provided for a orchestrating patching of microservices. A plurality of microservice patches are detected, the plurality of microservice patches made available for a plurality of different cloud platforms each provided by a different cloud provider of a plurality of cloud providers. Further, installation of the plurality of microservice patches in a running production system is centrally managed.

DETAILED DESCRIPTION

Figure 1:
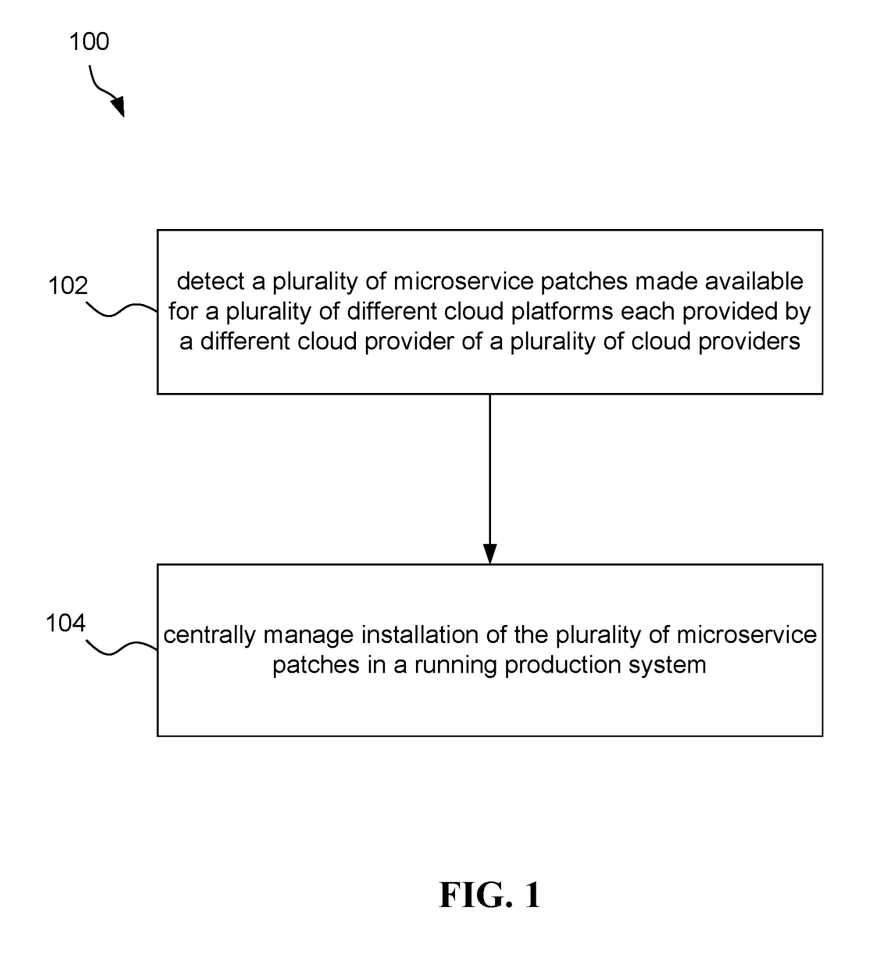
FIG. 1 illustrates a method for orchestrating patching of microservices, in accordance with one embodiment.

FIG. 1 illustrates a method 100 for orchestrating patching of microservices, in accordance with one embodiment. The method 100 may be may be performed by any computer system described below with respect to FIGS. 5 and/or 6.

For example, the method 100 may be performed by a computer system of an organization with a running production system that utilizes microservices, or a computer system of a third party interfacing the organization or a plurality of such organizations. In the context of the present description, an organization refers to a business entity having a platform on which the microservices of different cloud providers execute. Thus, the organization may be a customer of each of such cloud providers. In an embodiment, the method 100 may be performed by an orchestration system (e.g. see FIG. 2) that orchestrates the patching of microservices.

A cloud provider, or a cloud service provider (CSP), refers to a business entity that offers components of cloud computing, such as infrastructure as a service (IaaS), software as a service (SaaS) or platform as a service (PaaS). Cloud providers may use their own data centers and compute resources to host cloud computing-based infrastructure and platform services for customer organizations. In the present description, a cloud provider provides at least a cloud platform, microservices, and microservice patches. Various examples of cloud providers include Amazon Web Services™ (AWS), Google Cloud™, Microsoft Azure™, Red Hat OpenShift™, among others.

In operation 102, a plurality of microservice patches are detected. In the context of the present description, the plurality of microservice patches are made available for a plurality of different cloud platforms each provided by a different cloud provider of a plurality of cloud providers. In particular, each of the cloud providers may provide (e.g. build, publish, make available, etc.) one or more patches for the microservices that run on their respective cloud platforms. The microservices may also be provided (e.g. built, published, made available, etc.) by the cloud providers.

In the present description, a microservice patch refers to a patch (e.g. update) for a microservice. A microservice refers to a software component capable of being used to build a software application. Accordingly, the microservice may include computer (e.g. application) code for operations, interfaces, and/or any other sub-components capable of forming a microservice.

As mentioned above, a plurality of microservice patches are detected. In one embodiment, the microservice patches may be detected in response to publication of the microservice patches by the cloud providers. The microservice patches may be detected by receiving a notification from the cloud providers of the available microservice patches, in an embodiment. In another embodiment, the microservice patches may be detected by periodically monitoring the cloud platforms for available microservice patches.

In operation 104, installation of the plurality of microservice patches in a running production system is centrally managed. In the context of the present description, the running production system includes a computer system on which the microservices execute. For example, the running production system may be a computer system of the above mentioned organization that uses microservices of the various cloud platforms.

Also in the context of the present description, installation refers to applying the microservice patches to the relevant running instances of the microservices. It should be noted that the microservice patches may be installed in a manner that is dependent on a structure of the microservices within the running production system. In one embodiment, as described in more detail below, the microservices structure may enable the microservice patches to be installed independently of the respective microservices' application code.

As indicated above, installation of the microservice patches is centrally managed. Central management refers to use of a same computer system (e.g. platform) to manage installation of the microservice patches across the different cloud platforms. Any defined application or process may be used to provide the management of the microservice patch installations.

In an embodiment, the management may include deciding whether to install each of the microservice patches to the respective microservices. In another embodiment, the management may include completing the installation of one or more of the microservice patches to the respective microservices. In yet another embodiment, the management may include monitoring and/or reporting on an outcome of the installation (e.g. any resulting errors, etc.).

In one embodiment, the installation may be managed using machine learning. For example, machine learning may be used to select which microservice patches of the plurality of microservice patches are to be installed. In an embodiment, defined parameters may be input to a machine learning model trained to make a decision regarding whether a particular microservice patch should be installed. As an option, the microservice patch may be automatically installed when it is determined that the particular microservice patch should be installed. As another option, a recommendation for installation of the microservice patch may be provided to a user in accordance with the determination of whether the particular microservice patch should be installed.

To this end, the method 100 may provide central management of microservice patches associated with the microservices of different cloud platforms. This may be useful when a single business entity runs the microservices of various cloud platforms, such that separate management per cloud platform may be avoided.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
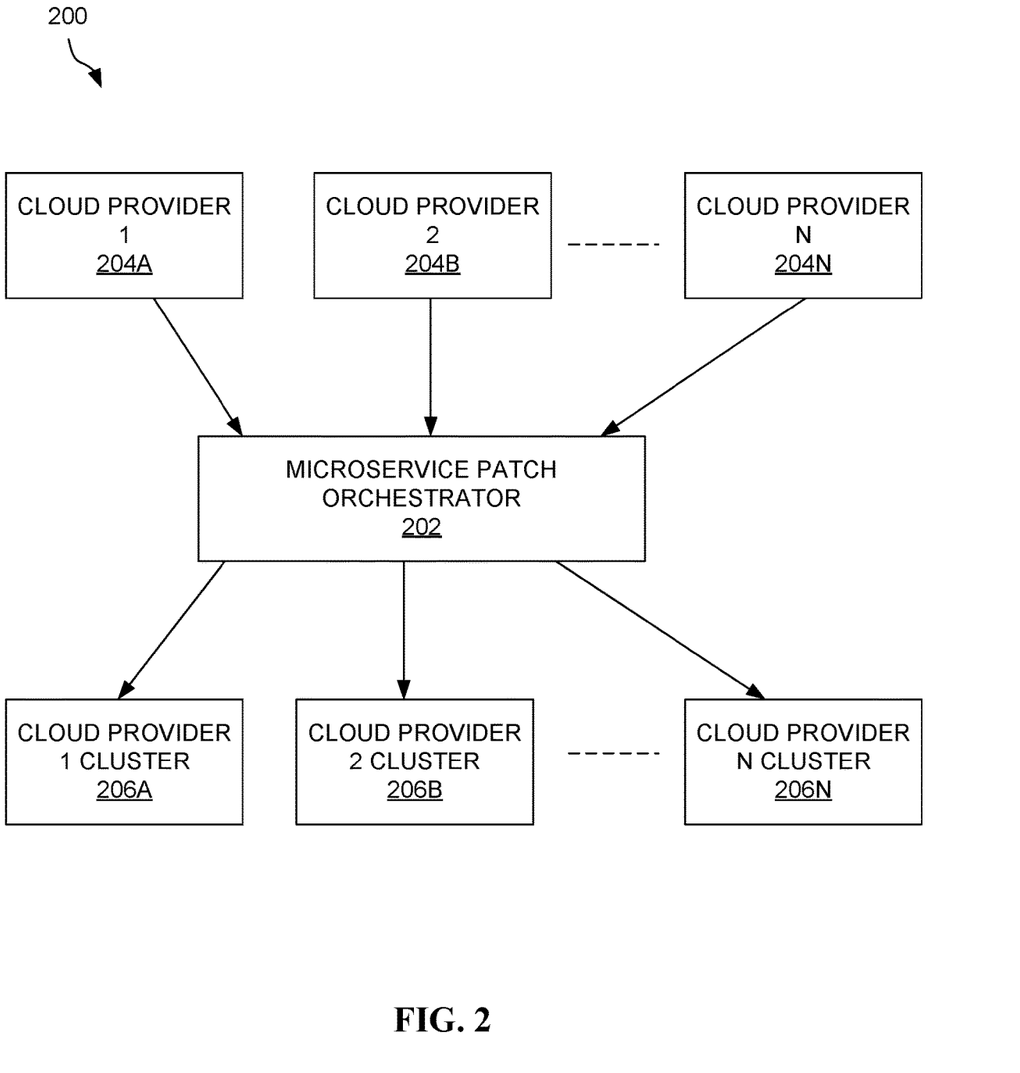
FIG. 2 illustrates a flow diagram of a system for orchestrating patching of microservices, in accordance with one embodiment.

FIG. 2 illustrates a flow diagram of a system 200 for orchestrating patching of microservices, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, a microservice patch orchestrator 202 is included in the system 200. The microservice patch orchestrator 202 is a computer system that is configured to orchestrate patching of microservices, as described herein.

The microservice patch orchestrator 202 interfaces a plurality of cloud providers 204A-N. The cloud providers 204A-N provide cloud platforms and associated microservices for use by customers. The cloud providers 204A-N also provide microservice patches as needed.

The microservice patch orchestrator 202 also interfaces a plurality of cloud provider clusters 206A-N. The cloud provider clusters 206A-N refer to the running instances of the microservices in a running production system. Thus, the running production system may utilize the cloud platforms of the various cloud providers 204A-N, including to run the microservices.

The interfaces may be provided using application programming interfaces (APIs). Of course, however, the interfaces may be any communication channels that enable the microservice patch orchestrator 202 to communicate with the cloud providers 204A-N and the cloud provider clusters 206A-N in accordance with the embodiments described herein.

The microservice patch orchestrator 202 detects a plurality of microservice patches made available for a plurality of different cloud platforms that are each provided by a different cloud provider of the plurality of cloud providers 204A-N. The microservice patches are patches for microservices running in the cloud provider clusters 206A-N. In one embodiment, the microservice patches may be detected in response to publication of the microservice patches by the cloud providers (e.g. by receiving a notification from the cloud providers 204A-N of the available microservice patches). In another embodiment, the microservice patches may be detected by periodically monitoring the cloud providers 204A-N for available microservice patches.

The microservice patch orchestrator 202 further centrally manages installation of the plurality of microservice patches in the running production system. In other words, the microservice patch orchestrator 202 manages installation of the microservice patches across the different cloud platforms. The microservice patch orchestrator 202 may include a defined application or process to provide such management.

In an embodiment, the microservice patch orchestrator 202 may decide whether to install each of the microservice patches to the respective microservices. As an option, the microservice patch orchestrator 202 may include a machine learning model that is trained to decide whether to install available microservice patches to respective microservices. In another embodiment, the micro service patch orchestrator 202 may complete the installation of one or more of the microservice patches to the respective microservices. In yet another embodiment, the microservice patch orchestrator 202 may monitor and/or report on an outcome of the installation (e.g. any resulting errors, etc.).

Figure 3:
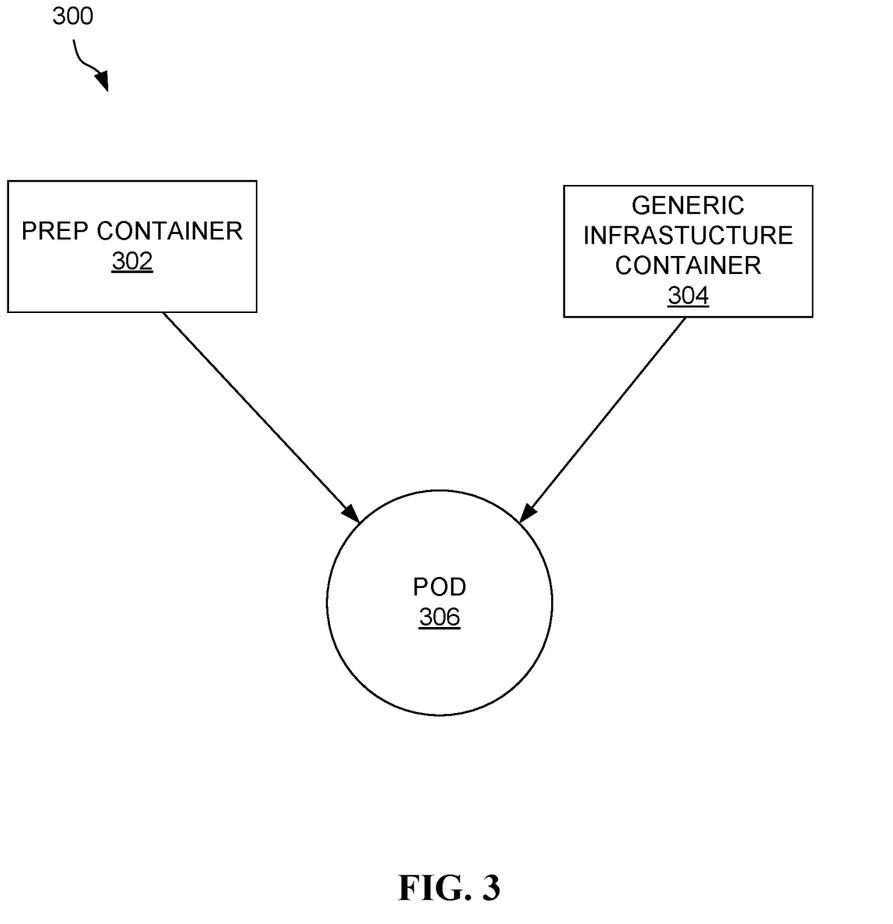
FIG. 3 illustrates an executable structure for a microservice, in accordance with one embodiment.

FIG. 3 illustrates an executable structure 300 for a microservice, in accordance with one embodiment. As an option, structure 300 may be implemented in the context of the details of the previous figure and/or any subsequent figure(s). For example, the clusters 206A-N of FIG. 2 may execute the microservices using the structure 300 of the present embodiment. Of course, however, the structure 300 may be implemented in the context of any desired environment. Further, the aforementioned definitions may equally apply to the description below.

As shown, a single prep (i.e. preparation) container 302 is constructed for the microservice. In the present embodiment, the single prep container 302 contains (executable) application code for the microservice. In an embodiment, the single prep container 302 does not require a guest operating system of any cloud platform on which the microservice will run, such that the single prep container 302 is usable across a plurality of different cloud platforms.

As also shown, a generic infrastructure container 304 is constructed. The generic infrastructure container 304 is constructed for a respective one of the different cloud platforms. Thus, the generic infrastructure container 304 may include code specific to the respective cloud platform, such as the guest operating system of the respective cloud platform. The generic infrastructure container 304 may be used in place of a traditional base image that traditionally packages together application code and infrastructure. Thus, the generic infrastructure container 304 may be separate from the prep container 302 having the application code for the microservice.

The microservice can then be run on the cloud platform using the generic infrastructure container 304 associated with the cloud platform and using the single prep container 302 constructed for the microservice. Likewise, the microservice could be run on any other cloud platform using both the prep container 302 (i.e. another instance of the prep container 302) and another generic infrastructure container constructed for that other cloud platform.

As shown in the present embodiment, the microservice is run on the cloud platform using an executable Kubernetes pod 306. The executable Kubernetes pod 306 is formed for the microservice to include the single prep container 302 constructed for the microservice and the generic infrastructure container 304 constructed for the cloud platform.

The prep container 302 copies its application code (files) to a shared folder in the pod 306 for access by the generic infrastructure container 304. The pod 306 then runs as if the application code and/or any other components of the prep container 302 were in the same container as the guest operating system and/or any other components of the generic infrastructure container 304.

In an embodiment, the Kubernetes pod 306 runs the prep container 302, and then, once complete, the Kubernetes pod 306 runs the generic infrastructure container 304. All existing configuration of the application microservice may remain the same, with the addition of some extra code to include the prep container 302 in the pod 306.

In the context of the present embodiment, any microservice patch for the microservice will be applied to the generic infrastructure container 304 that is being used to run the microservice. This ensures that the microservice patch is installed independently of (i.e. separately from, without changing, etc.) the application code within the prep container 302. In an embodiment, the microservice patch may be applied to the generic infrastructure container 304 by constructing a new generic infrastructure container having the microservice patch. The new generic infrastructure container may then be used in combination with the prep container 302 and the pod 306 to run the microservice.

Figure 4:
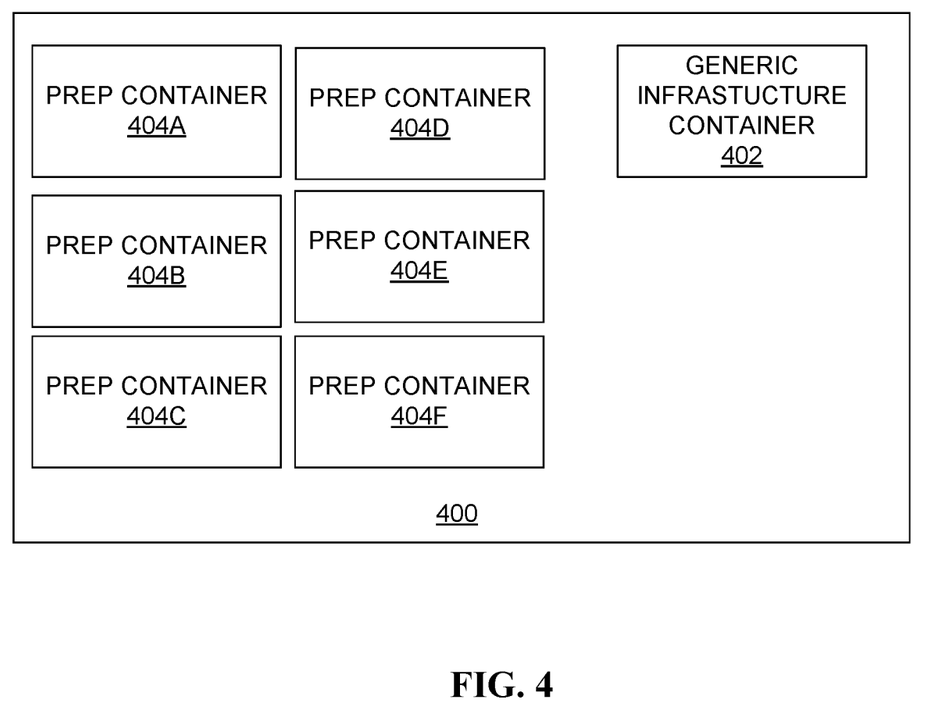
FIG. 4 illustrates a package structure for an application built from microservices, in accordance with one embodiment.

FIG. 4 illustrates a package structure 400 for an application built from microservices, in accordance with one embodiment. As an option, structure 300 may be implemented in the context of the details of the previous figure and/or any subsequent figure(s). For example, the clusters 206A-N of FIG. 2 may execute an application built using the structure 400 of the present embodiment. Of course, however, the structure 400 may be implemented in the context of any desired environment. Further, the aforementioned definitions may equally apply to the description below.

In an embodiment, an application can be built to run on a cloud platform from microservices available for that cloud platform. In this embodiment, for an application that has been built from one or more microservices associated with a particular cloud platform, a package 400 can be created which includes the generic infrastructure container 402 associated with the cloud platform and the single prep containers 404A-F constructed for the micro services. While six prep containers 404A-F are shown in the present embodiment, it should be noted that this is for illustrative purposes only.

When a microservice patch becomes available for one of the microservices, the microservice patch can be applied to the generic infrastructure container 402. In an embodiment, applying the microservice patch to the generic infrastructure container 402 can include creating a new generic infrastructure container that has the microservice patch. The new generic infrastructure container can then be used in the package 400.

To this end, the embodiments described above can enable infrastructure patches that are installed independently of the application code. This can be accomplished by managing patching at a microservice level, as opposed to an application level. Embodiments described above can also eliminate manual patching operations across the various cloud platforms, allowing for a seamless process for patching microservices which saves resources and protects against manual error. Further, embodiments described above may use machine learning to determine optimal configurations for deployment, including whether each microservice patch should be installed for a particular application (e.g. taking into consideration stability and importance). Optionally, after each deployment of a microservice patch, analytical graphs or other reports may be provided for regression, network issues, etc.

Figure 5:
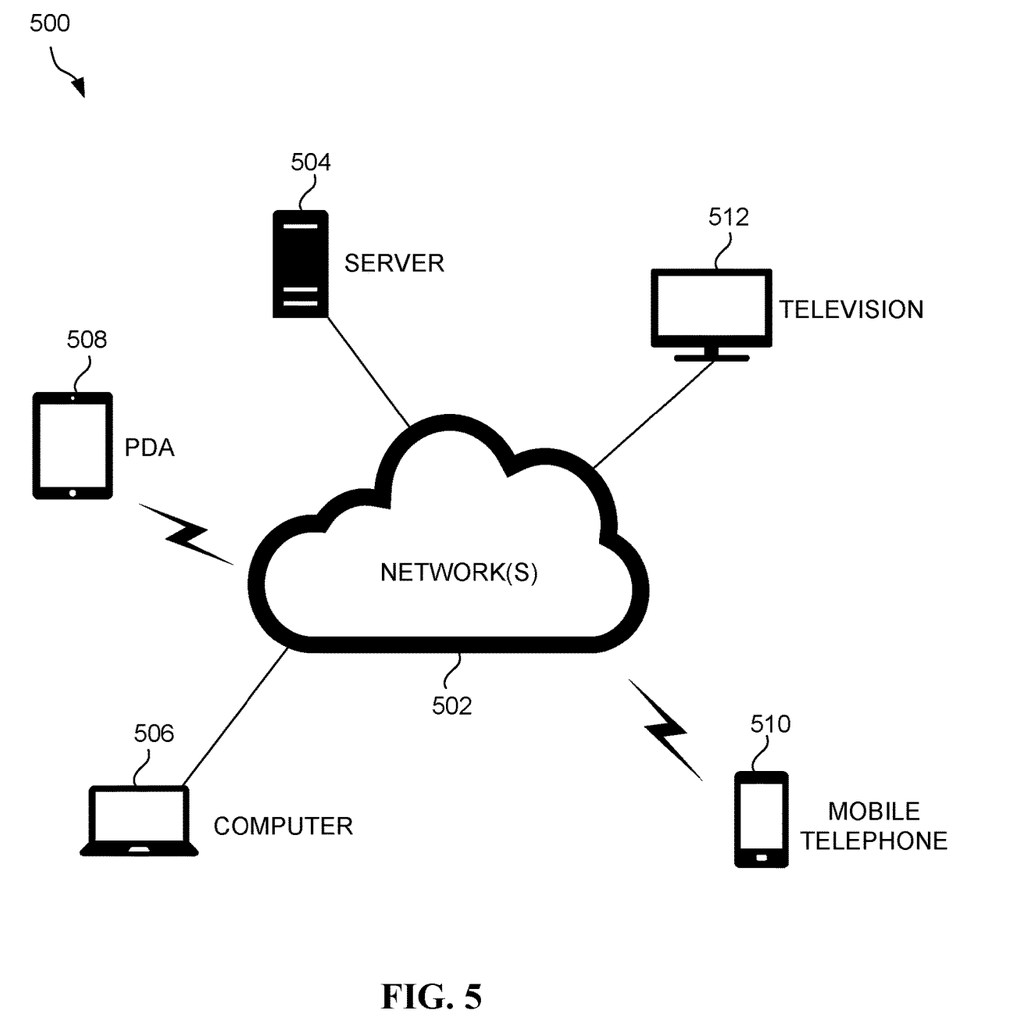
FIG. 5 illustrates a network architecture, in accordance with one possible embodiment.
Figure 6:
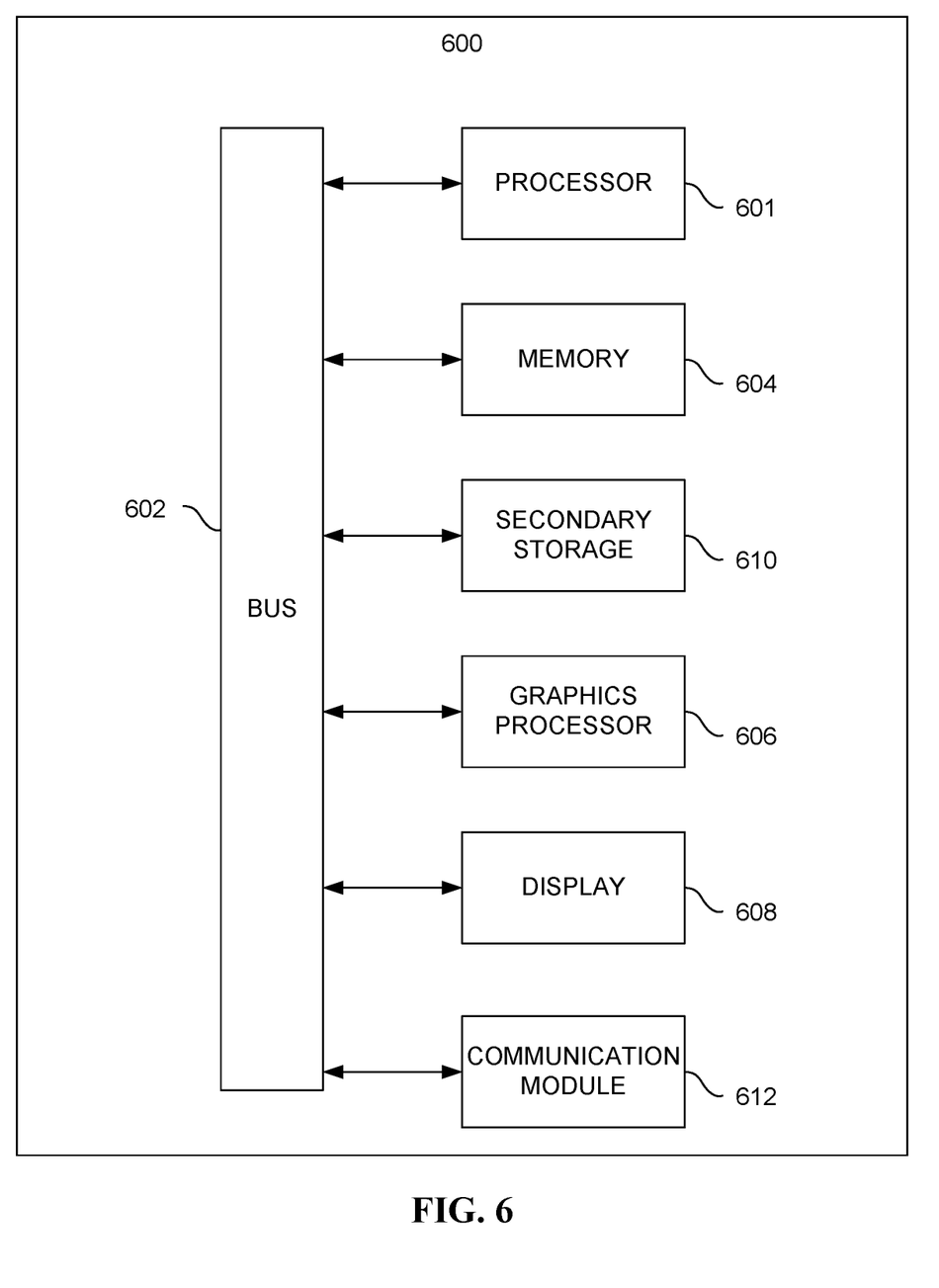
FIG. 6 illustrates an exemplary system, in accordance with one embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
determine a plurality of microservices utilized by a running production system of an organization and defining an application of the organization, wherein the plurality of microservices are provided by a plurality of different cloud providers and wherein each microservice of the plurality of microservices are executed via:
a single preparation container that contains executable application code for the microservice, wherein the single preparation container is usable across a plurality of different cloud platforms of the plurality of different cloud providers,
a generic infrastructure container that is separate from the single preparation container and that includes a guest operating system of a specific cloud platform of the plurality of different cloud platforms,
an executable Kubernetes pod that includes the single prep container and the generic infrastructure container and that includes a shared folder to which the executable application code for the microservice is copied from the single prep container for access by the generic infrastructure container to run the microservice
wherein the microservice executes on the specific cloud platform of the plurality of different cloud platforms using the executable Kubernetes pod;
detect a plurality of microservice patches made available for the plurality of microservices by the plurality of different cloud providers; and
centrally manage installation of the plurality of microservice patches for the application, including for each microservice of the plurality of microservices:
applying a microservice patch of the plurality of microservice patches to the generic infrastructure container that is being used to run the microservice such that the microservice patch is installed without changing the executable application code for the microservice.

2. The non-transitory computer-readable media of claim 1, wherein the plurality of microservice patches are updates to the plurality of microservices inutilized by the running production system.

3. The non-transitory computer-readable media of claim 1, wherein the microservice patches are applied to the plurality of generic infrastructure containers by constructing a plurality of new generic infrastructure containers having the microservice patches.

4. A method, comprising:
at a computer system:
determining a plurality of microservices utilized by a running production system of an organization and defining an application of the organization, wherein the plurality of microservices are provided by a plurality of different cloud providers and wherein each microservice of the plurality of microservices are executed via:
a single preparation container that contains executable application code for the microservice, wherein the single preparation container is usable across a plurality of different cloud platforms of the plurality of different cloud providers,
a generic infrastructure container that is separate from the single preparation container and that includes a guest operating system of a specific cloud platform of the plurality of different cloud platforms,
an executable Kubernetes pod that includes the single prep container and the generic infrastructure container and that includes a shared folder to which the executable application code for the microservice is copied from the single prep container for access by the generic infrastructure container to run the microservice
wherein the microservice executes on the specific cloud platform of the plurality of different cloud platforms using the executable Kubernetes pod;
detecting a plurality of microservice patches made available for the plurality of microservices by the plurality of different cloud providers; and
centrally managing installation of the plurality of microservice patches for the application, including for each microservice of the plurality of microservices:
applying a microservice patch of the plurality of microservice patches to the generic infrastructure container that is being used to run the microservice such that the microservice patch is installed without changing the executable application code for the microservice.

5. A system, comprising:
a non-transitory memory storing instructions; and
one or more processors in communication with the non-transitory memory that execute the instructions to:
determine a plurality of microservices utilized by a running production system of an organization and defining an application of the organization, wherein the plurality of microservices are provided by a plurality of different cloud providers and wherein each microservice of the plurality of microservices are executed via:
a single preparation container that contains executable application code for the microservice, wherein the single preparation container is usable across a plurality of different cloud platforms of the plurality of different cloud providers,
a generic infrastructure container that is separate from the single preparation container and that includes a guest operating system of a specific cloud platform of the plurality of different cloud platforms,
an executable Kubernetes pod that includes the single prep container and the generic infrastructure container and that includes a shared folder to which the executable application code for the microservice is copied from the single prep container for access by the generic infrastructure container to run the microservice
wherein the microservice executes on the specific cloud platform of the plurality of different cloud platforms using the executable Kubernetes pod;
detect a plurality of microservice patches made available for the plurality of microservices by the plurality of different cloud providers; and
centrally manage installation of the plurality of microservice patches for the application, including for each microservice of the plurality of microservices:
applying a microservice patch of the plurality of microservice patches to the generic infrastructure container that is being used to run the microservice such that the microservice patch is installed without changing the executable application code for the microservice.

* * * * *